3,262,574
FILTER WITH A HORIZONTAL ROTATING TABLE
Alfred Henri Parmentier, Lillois-W. Herzée, Belgium, assignor to UCB (Union Chimique-Chemische Bedrijven), S.A., Brussels, Belgium, a corporation of Belgium, and Produits Chimiques Pechiney-Saint-Gobain, Paris, France, a corporation of France
Filed July 17, 1962, Ser. No. 210,430
Claims priority, application Belgium, July 24, 1961, 606,424
4 Claims. (Cl. 210—393)

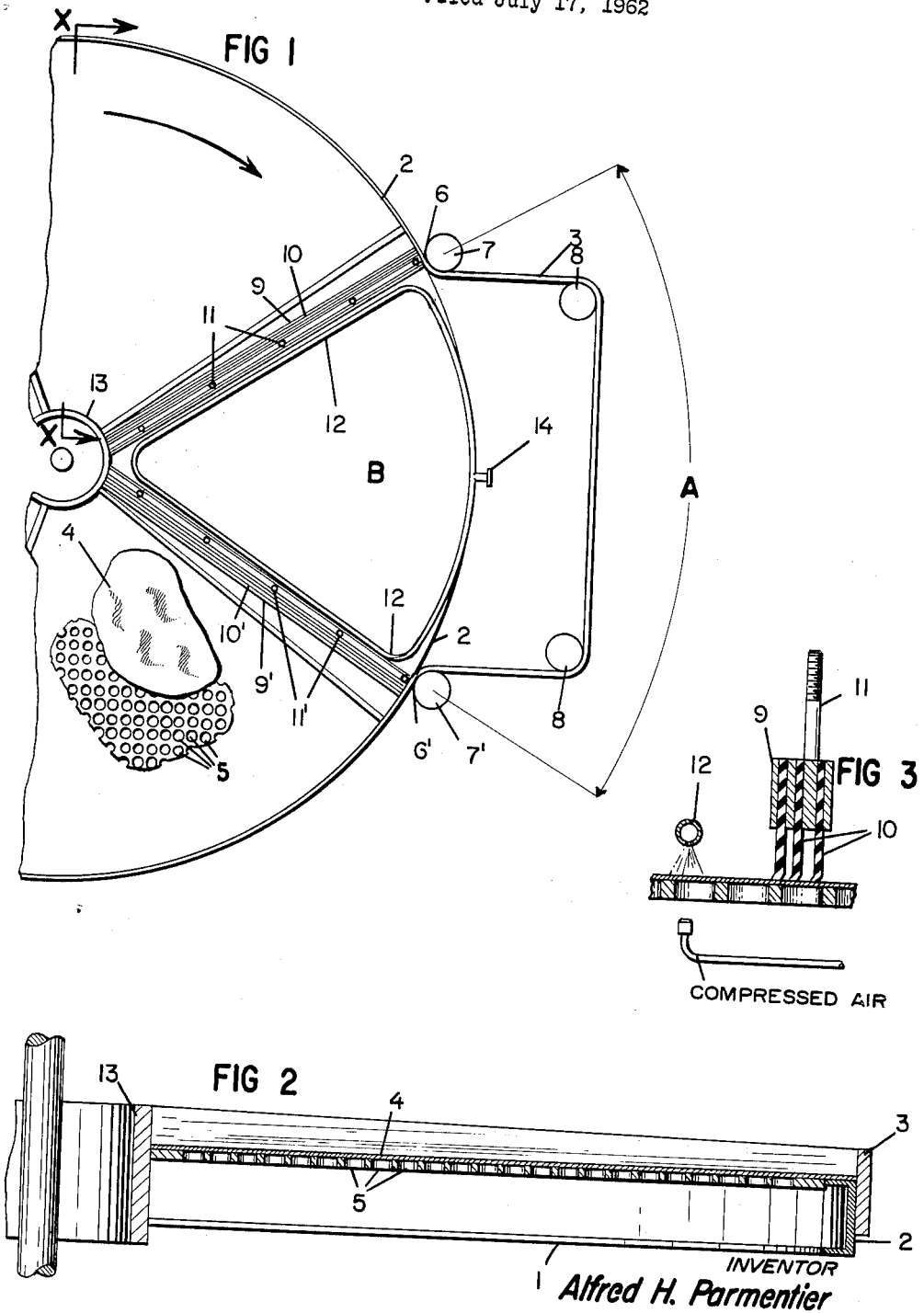
July 26, 1966  A. H. PARMENTIER  3,262,574
FILTER WITH A HORIZONTAL ROTATING TABLE
Filed July 17, 1962
INVENTOR
Alfred H. Parmentier
by Wenderoth, Lind & Ponack
Attorneys

United States Patent Office 3,262,574
Patented July 26, 1966

This invention relates to filters, more particularly to horizontal rotating table filters, and means of clearing and cleaning the filtering media of such filters.

It is known that horizontal table filters comprise essentially a rotating table or plate, generally provided with external and internal rims retaining the liquid to be filtered. This plate is divided radially into a plurality of sectors, each sector forming a box comprising a bottom and side walls, and also a top flat portion provided with apertures or perforations. Above the top portion is placed the filtering medium, such as cloth which serves as a filter. In addition, the bottoms of each sector are connected at the central portion of the rotating table to a distribution bottom divided into the same number of compartments as there are sectors. This distribution bottom is connected in a fluid-tight mannner by spring packings to a distributor lying therebeneath. The distributor, which is connected on the one hand to suction pipes and on the other hand to a compressed air pipe, is intended to apply to the various sectors either suction (filtering, washing, and drying phases) or compressed air (cloth clearing phase). For this purpose, the distributor has a plurality of apertures enabling each sector to be brought in turn into communication with the suction pipes or with the compressed air pipe. The filter has in addition, a device for feeding the liquid to be filtered, devices for washing the filter cake, a device for detaching the filter cake from the cloth (for example a scraper blade), and a device effecting the removal of the filter cake (for example a radial worm which passes the filtered residue over the outer rim of the rotating plate).

Briefly, this filter functions in the following manner: In the course of one complete revolution of the rotating table, each sector in succession is first fed with liquid to be filtered. The vacuum applied from that moment to the sector accelerates the separation of the filter cake from the filtrate. Each sector then passes into one or more washing zones in which the filter cake is rinsed with one or more washing liquids, this operation likewise taking place under vacuum. Finally, each sector passes beneath the scraper blade, the worm, and finally is fed with compressed air to detach the particles clogging the meshes of the filter cloth, and the cycle recommences.

Now, it has been found in the course of the practical utilisation of this type of filter that the filtering efficiency rapidly diminishes in dependence on time, in view of the fact that the devices provided for removing the cake from the cloth, namely the scraper blade, the worm, and the jet of compressed air, do not fully remove the solid particles engaged in the meshes of the cloth.

Furthermore, the outer rim integral with the filter table prevents perfect cleaning of the cloth, which should consist of removing from the table, by means of a rinsing liquid, the particles detached from the cloth by the compressed air. That is why periodically the filter must be put out of action for the purpose of cleaning the cloth. This results in a considerable loss of production and high maintenance costs.

The present invention aims at obviating the foregoing disadvantages and to this end consists in a filter, comprising a horizontal rotating table carrying a filter cloth or other filtering media, wherein the outer edge of the table is provided with a rim projecting above the table and constituted by an endless band of flexible material engaging in a fluid-tight manner against said edge, means being provided for holding a part of said band away from contact with said table edge to form a gap in said rim, said gap defining the edge-wise limit of a clearing and cleaning zone of the filter and serving to facilitate clearing and cleaning of that portion of filter media in said zone for the time being.

The present invention also consists of means of clearing and cleaning a filter cloth or other filtering media of horizontal rotating table filters, wherein a portion of said filter cloth or other filtering media is brought within a clearing and cleaning zone on the table and subjected to the action of compressed air and a washing liquid, said zone being bounded by two radial barriers, the internal rim of the rotating table, and by a portion of the external edge of said table, the remaining portion of said edge being engaged in a fluid-tight manner by a rim projecting above the table and constituted by an endless band of flexible material. Advantageously, a washing device and means for introducing compressed air are arranged in the clearing and cleaning zone. Each barrier may be composed of one or more scraper blades of flexible material. The washing device is of conventional design. The compressed air may be introduced from bottom to top through the filter cloth and supplied by means of a distributor. The table of the filter is thus provided with a zone the limits of which are constituted by the barriers, the interior rim, and the exterior rim of the rotating plate. The area of this zone may vary in dependence on the nature of the material to be filtered.

In order that the invention may be more readily understood, reference is made to the accompanying drawings which illustrate diagrammatically and by way of example one embodiment thereof and in which:

FIGURE 1 is a broken away plan view of a rotating table filter;

FIGURE 2 is a sectional elevation along the line X—X of FIGURE 1: and

FIGURE 3 is a sectional elevation of a barrier in the clearing and cleaning zone.

Referring to the drawings, the rotating table is designated by 1. Against the outside edge 2 of the rotating table 1 a flexible band 3 engages in a fluid-tight manner and projects above the plane of the table 1 and the filter cloth 4 which is supported by the top portion provided with apertures 5 of the various sectors (not shown). The projection of the band 3 (FIGURE 2) has a height at least equal to and preferably greater than the height of retention of the liquid to be filtered on the rotating table. The band 3 therefore replaces the outer rim of the rotating table in conventional filters. However, between the points 6 and 6′ of the table, over an arc designated by A in FIGURE 1, the band 3 is held away from the edge 2 of the rotating table 1 by means of two pairs of rollers 7, 7′ and 8, 8′. A zone B for clearing and cleaning the cloth is thus defined, the limits of said zone being constituted by the external edge 2, the internal rim 13, and by two radial barriers 9, 9′ forming at the centre an angle θ equal to the angle corresponding to the arc A in the drawing. However, the angle θ at the centre may be larger. Each barrier 9 and 9′ is composed of one or more scraper blades 10 mounted on an adjustable support 11 connected to the fixed superstructure of the filter. The bottom part of each blade comes into contact with the filter cloth 4. In order to prevent wear of the filter cloth, the scraper blades 10 are made of a flexible material such as natural or synthetic rubber or any other suitable material. The zone B has in addition a washing device 12 of conventional design fed by the connection 14. The zone B may be subjected to the action of compressed air passing through the cloth from bottom to top and fed by a distributor. The compressed air supply system is of conventional construction and is not shown in the drawings.

The clearing and cleaning zone in the rotating table filter may be located after the conventional cake removal device and before the conventional device for feeding the material to be filtered.

The rotating table filter provided with the clearing and cleaning zone according to the invention operates in the following manner:

In the course of its rotation and after passing through the cake removal zone, the table enters the clearing and cleaning zone B. In this zone, the cloth is subjected to the combined action of compressed air coming from the distributor and of the washing liquid flowing from the washing device 12. The solid particles of the filtration residue retained in the meshes of the cloth are driven off by the compressed air and held in suspension by the washing liquid. Since the rotating table has no outer rim in the zone B the washing liquid together with the solid particles contained in it overflows from the table, thus effecting perfect clearing and cleaning of the cloth. The cloth washing liquors may be re-cycled if desired. Moreover, in consequence of the presence of the barriers 9 and 9', it is impossible for the washing liquid from zone B to wet the filtration cake in the upstream direction or to dilute the liquid to be filtered in the downstream direction.

The filter of the present invention is particularly suitable for the filtration of the liquid resulting from the action of sulfuric acid on phosphates in the production of phosphoric acid. However, it may advantageously be used for all cases of filtration where a filter of the type described is used. The invention is not limited to the form of construction described and illustrated since this device may undergo various modifications without departing from the scope of the invention as claimed, described and illustrated in the drawings.

What I claim is:

1. A filter for filtering the pulp obtained in the manufacture of phosphoric acid by the wet process comprising a rotating horizontal table, a filtering cloth on said table, an endless band of flexible material engaging a portion of the periphery of said table in a fluid tight manner and projecting above the plane of said table, two radial dams defining upon the upper side of said table a sector for the continuous clearing and cleaning of said filtering cloth, each of said radial dams comprising a scraper blade of flexible material in contact with said filtering cloth, said band at the table periphery at said sector being spaced outwardly from the periphery of said table, water washing means for said filtering cloth mounted above said table in said sector and injection means for compressed air mounted below said sector injecting compressed air upwardly across said cloth whereby said cloth is continuously cleaned and cleared of gypsum film and encrustations of fluosilicates thereby eliminating the usual stoppages for such purposes.

2. A filter as claimed in claim 1, wherein said endless band is of rubber.

3. A filter as claimed in claim 1, wherein said table has an internal rim and said sector is bounded by said two radial dams, by said internal rim and by a portion of the periphery of said rotating table.

4. A filter as claimed in claim 1, wherein said water washing means comprises a sprinkling device.

References Cited by the Examiner

UNITED STATES PATENTS

| | | | |
|---|---|---|---|
| 985,611 | 2/1911 | Lynch | 210—391 X |
| 1,150,263 | 8/1915 | Godbe | 210—396 X |
| 2,588,912 | 3/1952 | Denhard | 210—396 |
| 2,716,494 | 8/1955 | Hursh | 210—396 |

REUBEN FRIEDMAN, *Primary Examiner.*

HERBERT L. MARTIN, *Examiner.*

S. ZAHARNA, *Assistant Examiner.*